US011850951B2

(12) United States Patent
Sawata et al.

(10) Patent No.: US 11,850,951 B2
(45) Date of Patent: Dec. 26, 2023

(54) ELECTRIC PROPULSION SYSTEMS

(71) Applicant: Hamilton Sundstrand Corporation, Charlotte, NC (US)

(72) Inventors: Tadashi Sawata, Coventry (GB); Michael C. Harke, DeForest, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 601 days.

(21) Appl. No.: 16/718,259

(22) Filed: Dec. 18, 2019

(65) Prior Publication Data

US 2020/0215922 A1     Jul. 9, 2020

(30) Foreign Application Priority Data

Jan. 8, 2019    (EP) ..................................... 19275003

(51) Int. Cl.
| | |
|---|---|
| *B60L 50/15* | (2019.01) |
| *B64C 39/02* | (2023.01) |
| *B64D 27/10* | (2006.01) |
| *F02B 63/04* | (2006.01) |
| *H02P 9/00* | (2006.01) |
| *B64U 30/20* | (2023.01) |
| *B64U 50/19* | (2023.01) |

(52) U.S. Cl.
CPC .............. *B60L 50/15* (2019.02); *B64C 39/02* (2013.01); *B64D 27/10* (2013.01); *F02B 63/042* (2013.01); *H02P 9/008* (2013.01); *B60L 2200/10* (2013.01); *B64U 30/20* (2023.01); *B64U 50/19* (2023.01)

(58) Field of Classification Search
CPC ...... B60L 50/15; B60L 2200/10; B60L 50/10; B64C 39/02; B64C 2201/042; B64D 27/10; F02B 63/042; H02P 9/008; Y02T 10/7072
USPC .................. 180/54.1; 290/46, 47, 48, 51, 52
See application file for complete search history.

(56) References Cited

U.S. PATENT DOCUMENTS

| | | | |
|---|---|---|---|
| 9,048,765 | B2 | 6/2015 | Dobbs |
| 9,371,010 | B2 | 6/2016 | Holmes et al. |

(Continued)

FOREIGN PATENT DOCUMENTS

| | | |
|---|---|---|
| CN | 101861261 A | 10/2010 |
| CN | 104044581 A | 9/2014 |

(Continued)

OTHER PUBLICATIONS

European Office Action for EP Application No. 19275003.2 dated Nov. 15, 2021, 3 pages.

(Continued)

*Primary Examiner* — Charles Reid, Jr.
(74) *Attorney, Agent, or Firm* — CANTOR COLBURN LLP (57) ABSTRACT

An electric propulsion system is provided which includes a prime mover; an electric generator which is arranged to be driven by the prime mover to generate electric power; an electric propulsion motor; and an integrated generator-motor controller arranged to control the supply of said electric power to the electric propulsion motor in response to a control signal. The integrated generator-motor controller is also arranged to feed-forward to the generator a power demand parameter associated with the control signal so as to control the power output of the generator.

15 Claims, 5 Drawing Sheets

(56) References Cited

U.S. PATENT DOCUMENTS

| | | | |
|---|---|---|---|
| 9,469,185 B2 | 10/2016 | Okada et al. | |
| 11,479,128 B2 | 10/2022 | Li et al. | |
| 2006/0235576 A1* | 10/2006 | Matsuda | B60K 6/44 |
| | | | 701/1 |
| 2010/0025131 A1 | 2/2010 | Glocer et al. | |
| 2011/0017532 A1* | 1/2011 | Langford | B60K 6/24 |
| | | | 903/930 |
| 2016/0280386 A1 | 9/2016 | Mestler et al. | |

FOREIGN PATENT DOCUMENTS

| | | | |
|---|---|---|---|
| CN | 108556644 A | 9/2018 |
| EP | 1098430 A2 | 5/2001 |
| EP | 1712400 A2 | 10/2006 |
| EP | 2476618 A2 | 7/2012 |
| EP | 3375981 A1 | 9/2018 |
| EP | 3090951 B1 | 12/2018 |
| JP | 2007306679 A | 11/2007 |
| JP | 5384771 B1 | 1/2014 |
| WO | 2009050456 A2 | 4/2009 |

OTHER PUBLICATIONS

European Office Action for application EP 19275003.2, dated Mar. 26, 2021, 4 pages.
European Search Report for Application No. 19275003.2, dated Jun. 24, 2019 7 pages.
First Chinese Office Action for Application No. 202010014659.8, dated Apr. 29, 2023, 8 pages.

* cited by examiner

ELECTRIC PROPULSION SYSTEMS

FOREIGN PRIORITY

This application claims priority to European Patent Application No. 19275003.2 filed Jan. 8, 2019, the entire contents of which is incorporated herein by reference.

TECHNICAL FIELD

The present disclosure relates to electric propulsion systems, such as those used to provide propulsion for an aircraft.

BACKGROUND

Conventional propulsion systems, such as those used to propel aircraft, utilise combustion engines (such as turboprop or turbofan gas turbines) to generate propulsion directly. The use of combustion engines is particularly suited to aircraft because they are powered by hydrocarbon-based fuels which have a very high energy density. Using such an energy-dense power source reduces the weight of fuel the aircraft must carry, increasing efficiency and range.

However, the increasing cost of fuel and environmental concerns regarding the use of fossil fuels has led to an increased interest in alternative power sources for aircraft. Furthermore, combustion engines generally have poor dynamic response and can be highly inefficient, especially if they not operated under optimal conditions.

Electric motors have been proposed as an alternative source of propulsion. These can be highly efficient, exhibit greater dynamic response and can be easier to maintain than combustion engines. Improvements in battery technologies have enabled the development of experimental all-electric aircraft in which electric motors powered by batteries provide propulsion for the aircraft. However, even the most advanced battery chemistries can provide only a small fraction of the energy density of hydrocarbon fuels. Battery-powered aircraft, therefore, cannot yet compete with conventionally powered aircraft in terms of load capacity, speed or range.

Alternative electric propulsion systems have been proposed in which a conventional engine, powered by energy-dense fuel, is used to drive an electric generator. The electric power generated by the generator is then in turn used to power one or more electric motors to provide propulsion. The present disclosure relates to improvements in such electric propulsion systems.

SUMMARY

According to a first aspect of the present disclosure there is provided an electric propulsion system comprising of a prime mover; an electric generator arranged to be driven by the prime mover to generate electric power; an electric propulsion motor; and an integrated generator-motor controller arranged to control the supply of said electric power to the electric propulsion motor in response to a control signal; wherein the integrated generator-motor controller is also arranged to feed-forward to the generator a power demand parameter associated with the control signal so as to control the power output of the generator.

Because the system utilises an electric motor to provide propulsion, it can provide an increased dynamic response (i.e. how quickly the motor can deliver requested changes in propulsion). Furthermore, because the power demand parameter is fed-forward to the generator, the dynamic response of the system may be further enhanced, as will be explained in more detail below.

The prime mover may be an engine (e.g. a combustion engine powered by hydrocarbon-based fuels such as a gas turbine engine). However, because the prime mover is used to generate electric power rather than propulsive force, the prime mover can be operated continuously in optimal conditions (e.g. at constant speed where efficiency is highest), resulting in increased efficiency compared to conventional systems where the speed of the engine is changed according to varying propulsion requirements. The prime mover may be controlled to maintain a constant speed (e.g. by an electronic engine control unit controlling a throttle).

Electric motors typically can respond more quickly than combustion engines (e.g. because electrical-to-mechanical energy conversion mechanisms can be much quicker than chemical-to-mechanical energy conversion mechanisms utilised in combustion engines) Electric motors therefore generally exhibit a greater dynamic response (i.e. they are able to change speeds more quickly). However, this improved dynamic response is dependent upon the motor being supplied with sufficient power.

In conventional electric propulsion systems, the generator is controlled (typically by a Generator Control Unit or GCU, which is separate from a propulsion motor controller) to maintain an output voltage (AC or DC) of the generator at a reference value within a specified tolerance using a feedback loop, where the output voltage is measured and fed back to the generator. When the propulsion motor requires increased power (e.g. due to a control signal demanding increased motor speed), the associated increase in current draw results in a drop in output voltage of the generator. This voltage drop is detected and fed back to the generator which increases its output power in response, to correct the voltage drop and provide the required power. In certain arrangements the output voltage is measured on the DC-link of a variable voltage variable frequency drive circuit.

However, this feedback mechanism has an inherent delay between a control signal being issued and the requisite power being delivered by the generator and thus the electric motor achieving the required speed. This leads to decreased performance of the propulsion system, as whilst the electric motor itself is capable of delivering changes in power or torque (and thus speed) very quickly, it is limited by the latency of the generator's feedback loop.

Typically, power quality requirements specify an envelope within which the voltage Point Of Regulation (POR) must stay for a given transient power demand. In conventional systems therefore, to ensure that the propulsion system can cope with large transient power demands, a generator capable of a large peak current must be provided which can tolerate sudden changes in output current. However, the power generation capacity of such a generator may be unnecessary for steady-state operation, and thus adds both expense and weight to the propulsion system. This can greatly restrict the implementation of such systems in areas where weight is a critical concern (such as on aircraft).

Contrastingly, in examples of the present disclosure, because the power demand parameter is fed-forward to the generator, the inherent latency produced by a conventional feedback loop is avoided. Thus, changes in generator power output necessitated by the control signal are delivered more punctually, resulting in an increased dynamic response of the whole system.

For instance, the power demand parameter fed-forward to the generator may indicate that the presently applied control signal will result in an increased power demand from the electric motor. The generator can then provide this increased power demand before the output of the generator indicates any power deficiency (i.e. before a conventional feed-back system could react).

The integrated generator-motor controller of the present disclosure controls the generator using a feed-forward mechanism. As such, changes in power demand may be anticipated and large variations in output current may be at least partially mitigated. As a result, a generator capable of delivering a lower peak current may be used (e.g. one that is selected to more closely match the desired steady-state performance), which may reduce the weight and cost of the propulsion system. Any reduction in weight can be particularly desirable in aerospace applications (e.g. on aircraft).

Furthermore, in some examples of the present disclosure a generating capacity of the generator may be more closely matched to a power of the propulsion motor, enabling further cost and/or weight efficiencies.

The ability of the generator to deliver changes in power is sometimes referred to as the generator's bandwidth. For example, bandwidth may be defined as the frequency (of changes in power demanded by a control signal) up to which the generator can respond adequately to the control signals (e.g. where power delivered is no less than ~50% of the power demanded by the control signal). Similarly, the prime mover and the electric motor also have a characteristic bandwidth.

Dynamics of load will affect the power density (i.e. power output per kilogram) and control stability of the propulsion system. With the system of this disclosure, the bandwidth of the generator and prime mover system can be significantly narrower than that achievable by the propulsion motor without limiting the full exploitation opportunities of the electric propulsion system.

The propulsion system can be tuned such that the bandwidth of power draw by the electric motor is within the bandwidth of the generator. Matching the transient characteristics of the motor and generator in this way may lead to better system stability.

As mentioned above, the dynamic response of electric motors (i.e. how quickly they can deliver changes in motor speed) is typically much higher than that of conventional engines (e.g. gas turbines). Thus, using electric motors for propulsion in a system which is not limited by the bandwidth of the generator can lead to opportunities for more dynamic control of the propulsion force. For example, dynamic control of the propulsion force on an aircraft may be used to improve the aircraft's performance. The speeds of multiple propulsion motors may be individually controlled for yaw or roll control as well as maintaining required thrust.

In preferred examples the prime mover is a combustion engine, such as a gas turbine engine. The prime mover is preferably arranged to be powered by a fuel with a high-energy density (e.g. a hydrocarbon-based fuel such as kerosene).

The prime mover is preferably arranged to operate at a substantially constant speed. This may be a speed at which the prime mover is most efficient (i.e. the speed at which the prime mover delivers the greatest power per mass of fuel). In some examples the prime mover is arranged to operate at a speed of 10,000 rpm or more, e.g. around 20,000-70,000 rpm or even higher. In one particular example the prime mover is an Auxiliary Power Unit (APU) which operates at approximately 48,800 rpm.

In some examples the generator comprises an alternating current (AC) generator (e.g. a synchronous AC generator). The generator may be arranged to generate three phase AC power. The generator may comprise one or more field windings to which a field current (e.g. a DC current) is supplied. The generator may be arranged to control the field current supplied to the one or more field windings according to the power demand parameter to control the power output of the generator. In some examples the power demand parameter may comprise the field current supplied to the one or more field windings.

The control signal may comprise a command relating to the propulsion generated by the electric propulsion motor. For example, the control signal may comprise a motor speed command, a thrust (propulsion) command, a torque command or a power command.

The power demand parameter preferably comprises an indication of the power demand of the electric motor that is required to carry out a command comprised by the control signal. In some examples the power demand parameter comprises an instantaneous power demand (i.e. of the electric propulsion motor).

The integrated generator-motor controller may be arranged to receive a measure of the current speed of the electric propulsion motor. This current speed may be used by the controller in combination with the control signal to determine a required torque. For example, the controller may be arranged to calculate a target motor speed based on the control signal (e.g. the control signal may comprise the target motor speed) and to determine a speed difference between a target motor speed and the current motor speed. The torque required to achieve this speed difference may then be calculated.

In some such examples the power demand parameter is determined using the required torque. For example, the required torque may be multiplied by a target motor speed to determine an instantaneous power demand of the motor which may comprise the power demand parameter.

Additionally or alternatively, a thrust model may be used to determine the power demand parameter. For example, the behaviour and power demands of the electric propulsion motor in response to the control signal (e.g. a thrust demand) may be modelled and used to determine the power demand parameter.

In examples featuring an AC generator, the integrated generator-motor controller may comprise a rectifier arranged to convert an AC output of the generator into direct current (DC) power. The integrated generator-motor controller may comprise an inverter arranged to receive the DC electric power from the rectifier over a DC link and convert it into AC electric power (e.g. three-phase AC power) which is supplied to the electric propulsion motor.

Ordinarily, such a DC link may require several filter components (e.g. large capacitors) arranged to minimise the impact of voltage fluctuations. However, a further advantage of the increased stability provided by the feedforward control in the system according to the present disclosure is that the number and size of such DC link filter components may be reduced, reducing part count, cost and weight.

An addition of command state filters and/or detuning may be utilized as necessary. These may be used to match the dynamic response or bandwidth of the electric motor to that of the generator, for increased stability. For example, it may be desirable to slow-down the electric motor response (i.e. reduce its bandwidth) to more closely match the bandwidth of the generator. This may be achieved using a low-pass filter on the electric propulsion motor input or by reducing a gain of a motor controller.

Integrating the motor and generator controller as described herein also presents an opportunity to manipulate intermediate states (such as the dc link voltage) to optimize system efficiency.

The integrated generator-motor controller may be arranged to control the inverter to control the supply of power to the electric propulsion motor, e.g., using pulse width modulation (PWM) control.

In some examples of the present disclosure the electric propulsion system also comprises a conventional generator output feedback loop. For instance, the integrated generator-motor controller may be arranged to determine an indicator of electric power generated by the generator. The indicator of electric power may comprise any suitable measure such as current or power but in preferred examples the indicator of electric power comprises an output voltage of the generator (e.g. a voltage of the DC output of the rectifier, i.e. the DC link voltage).

In examples featuring a generator output feedback loop the power demand parameter may be determined using the indicator of electric power generated by the generator, i.e. both the feedback and feedforward mechanisms are combined.

The propulsion system may further comprise an energy storage device which is arranged to be connected to the generator and/or the propulsion motor. The energy storage device may comprise a battery (e.g. a lithium-iron or a nickel-cadmium battery), a capacitor, a supercapacitor or any other suitable energy device known in the art per se.

The energy storage device is preferably connected in parallel with the generator and the propulsion motor. For example, the energy storage device may be connected in parallel between with the rectifier and the inverter (i.e. connected to the DC link).

The energy storage device may be used as an auxiliary power source (e.g. to provide additional power required by the propulsion system, or to provide power to other systems external to the propulsion system such as conventional aircraft electrical systems). The electric propulsion system may be arranged to charge the energy storage device using electric power from the generator. The electric propulsion system may be arranged to charge the energy storage device by operating the electric propulsion motor as an electric generator driven by an external source. In such examples the electric propulsion system may comprise a power converter arranged to convert power produced by the electric propulsion motor when operating as an electric generator (e.g. arranged to convert AC power produced by the motor into DC power to charge the energy storage device). In some such examples this power converter may be provided with/ also comprise the inverter. For example, the electric propulsion system may be used primarily to operate a propeller on an aircraft and in such examples the propeller may also be able to act as a "windmill" (e.g. driven by airflow past the propeller when the aircraft is stationary or taxiing on the ground).

In some examples the generator may be operable as a starter motor for the prime mover (i.e. by providing electrical power to the generator). For example, the electric propulsion system may be arranged such that energy stored in an energy storage device can be directed, via a power converter, to the generator to provide an initial starting torque to the prime mover. The power converter may comprise the inverter (i.e. the inverter may also be used to supply starting AC power to the generator). In such examples the electric propulsion system may comprise first switching means (e.g. between the inverter and the propulsion motor) to enable the output of the inverter to be selectably connected to the generator or the propulsion motor. The electric propulsion system may comprise second switching means between the generator and the rectifier so as to allow disconnection of the rectifier from the generator during starting of the prime mover. Alternatively, the power converter may be separate to the inverter (e.g. provided with the rectifier), in which case switching means may not be required.

As mentioned above, the electric propulsion system may be used in conjunction with a propeller (e.g. on an aircraft). The propeller may be a variable-pitch propeller.

The electric propulsion system may be arranged to provide a thrust reversal function. For instance, in examples where the electric propulsion motor is arranged to drive (rotate) a propeller to produce forward thrust, a pitch of the propeller may be changed to a reverse thrust configuration (i.e. in which thrust is produced in a reverse direction for the same direction of rotation). This may be used to provide a braking force.

When the propeller is not being driven to provide thrust, air flowing past the propeller (e.g. when an aircraft is moving) may accelerate the propeller. In such scenarios, electrical energy may be regenerated from the air flow by using the electric motor as a generator in conjunction with a suitable power converter. The regenerated electrical energy may be used to charge an energy storage device or may be dissipated.

The propulsion system disclosed herein may be used to provide propulsion for many different types of vehicle. However, in one preferred example the propulsion system is implemented on an aircraft. In some such examples the control signal may be issued by an aircraft flight computer (e.g. in response to a pilot's inputs or an autopilot system).

As mentioned above, the propulsion system of the present disclosure may be used in many different applications in which different amounts of propulsive force and/or electric power are required. For example, for small passenger aircraft (e.g. capable of carrying up to 50 passengers) a typical propulsion system may deliver a power of around 1 MW.

The present disclosure extends to an aircraft propulsion system comprising of at least one prime mover; at least one electric generator arranged to be driven by the least one prime mover to generate electric power; one or more electric propulsion motors arranged to provide propulsion to an aircraft; and an integrated generator-motor controller arranged to control the supply of said electric power to the at least one electric propulsion motors in response to a control signal; wherein the integrated generator-motor controller is also arranged to feed-forward to the at least one generator a power demand parameter associated with the control signal so as to control the power output of the at least one generator.

In some sets of examples of the aircraft propulsion system one central prime mover may drive several electric generators. Driving multiple electric generators with one large prime mover can increase the efficiency of the aircraft propulsion system. However, powerful prime movers capable of driving multiple generators may be impractical (e.g. due to weight or size). Therefore, in other examples the (or each) prime mover drives only one electric generator.

It will also be appreciated that in some examples there may be a plurality of electric propulsion motors connected to one (or more than one) generator.

DETAILED DESCRIPTION

Figure 1:
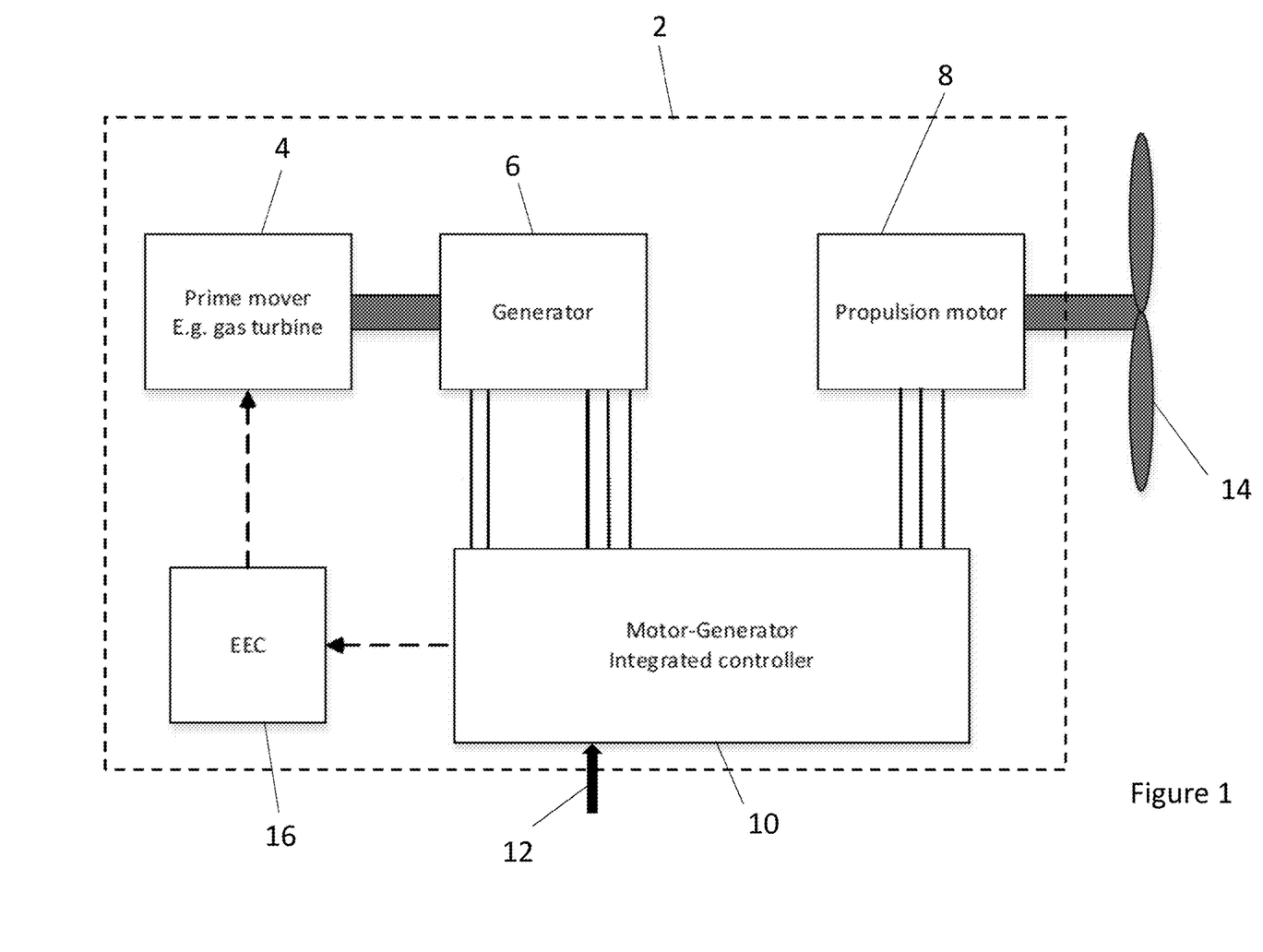
FIG. 1 shows a schematic view of an electric propulsion system according to one example of the present disclosure.

FIG. 1 shows a schematic view of an electric propulsion system according to one example of the present disclosure. The electric propulsion system 2 comprises a prime mover 4 (e.g. a gas turbine engine), a three phase AC generator 6, a three phase electric motor 8 and an integrated motor-generator controller 10.

The prime mover 4 is arranged to drive the generator 6 to produce electric power, which is in turn used to power the electric motor 8 to rotate a propeller 14. The rotation of the propeller 14 generates thrust with a magnitude that is dependent upon the speed of its rotation.

The prime mover 4 is controlled by a prime mover controller 16 (e.g. Electronic Engine Controller (EEC) of gas turbine) to maintain a constant speed. This speed may be chosen to maximize the efficiency of the prime mover 4.

The controller 10 controls the supply of electric power to the electric motor 8 in response to a control signal 12 (e.g. a motor speed demand, a thrust demand, a torque demand or a power demand). The control signal 12 may be sent from a separate control system (e.g. a flight computer).

The controller 10 is also arranged to control the power output of the generator 6 (when driven at a constant speed by the prime mover 4) by feeding-forward to the generator 6 a power demand parameter associated with the control signal 12.

The power demand parameter is representative of an instantaneous power demand of the propulsion motor 8 resulting from the control signal 14. The generator 6 is arranged to generate a power output that is consistent with this power demand to ensure the electric motor 8 can effectively carry out changes in speed required by the control signal. By feeding forward this power demand and controlling the generator accordingly, the electric propulsion system 2 can deliver high dynamic responsiveness compared to conventional systems which rely on feedback from the generator output.

The integrated motor-generator controller 10 may also provide feedforward control to the prime mover 4 via the prime mover controller 16 (e.g. also using the power demand parameter). This may be used to control the prime mover 4 to maintain a constant speed when the power demand on the generator 6 varies, leading to improved performance of the propulsion system 2.

Figure 2:
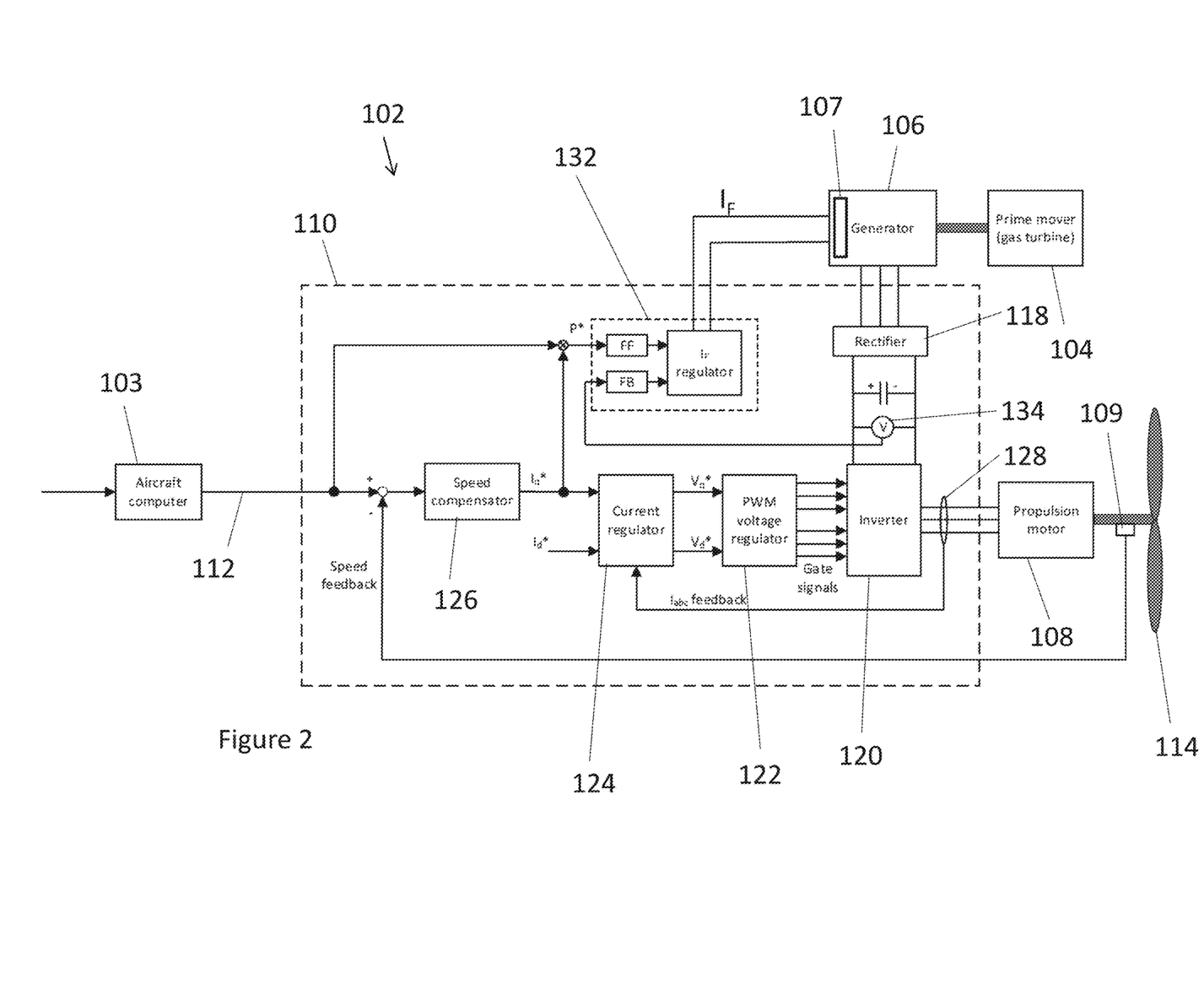
FIG. 2 shows a more detailed schematic view of an electric propulsion system according to the present disclosure.

FIG. 2 shows a more detailed schematic view of an electric propulsion system according to the present disclosure. The electric propulsion system 102 comprises a prime mover 104 (e.g. a gas turbine engine), a three phase AC generator 106, a three phase electric motor 108 and an integrated motor-generator controller 110.

The prime mover 104 is arranged to drive the generator 106 to produce three phase AC electric power, which is in turn used to power the electric motor 108 to rotate a propeller 114. The rotation of the propeller 114 generates thrust with a magnitude that is dependent upon the speed of its rotation.

An aircraft computer 103 receives a control input (e.g. from an aircraft pilot's controls or an autopilot system) comprising a demand for a certain level of thrust to be generated by the propeller 114. The aircraft computer 103 interprets the control input and generates a motor speed command 112 for the motor to rotate at a desired speed (determined from the thrust demand), which is sent to the controller 110.

The integrated motor-generator controller 110 comprises a rectifier 118, an inverter 120, a PWM voltage regulator 122, a current regulator 124 and a speed compensator 126. The difference between the current speed of the motor 108 (sensed by speed sensor 109) and the desired speed indicated by the motor speed command 112 is calculated and the speed compensator 126 determines the torque required to be delivered by the motor 108 to achieve the desired speed.

The required torque is sent to the current regulator 124 in the form of a torque current Iq*. Based on a comparison between the torque current Iq* and the current Iabc presently being supplied to the motor 108 (detected with a current sensor 128), the current regulator 124 outputs a torque voltage Vq*, which is sent to the PWM voltage regulator 122.

The rectifier 118 is arranged to receive the three phase electric power generated by the generator 106 and output DC electric power. The DC power output by the rectifier 118 is sent to the inverter 120 over a DC link. The inverter 120 then outputs three phase AC power to the electric motor 108 under the control of a plurality of gate signals sent by the PWM voltage regulator 122. The timing and duration of these gate signals are determined by the PWM voltage regulator 122 on the basis of the torque voltage Vq*, such that the required torque is delivered by the motor 108 and the desired speed is achieved.

To ensure that the generator 106 is generating sufficient power to deliver the required torque, the controller 110 is further configured to provide feedforward control to the generator 106.

The controller 110 is arranged to determine an instantaneous power demand P* from the motor speed command 112 and the torque current Iq* (e.g. by multiplying the desired speed by the torque current Iq*). The integrated controller 110 utilizes the instantaneous power demand P* as feedforward (FF) compensation for the regulation of a field current $I_F$ of the generator 106. The generator 106 comprises a field winding 107 to which the field current $I_F$ is supplied. A field current regulator 132 receives the instantaneous power demand P* and supplies the field current $I_F$ required for the power output of the generator 106 to meet the instantaneous power demand. The use of feedforward compensation allows for commanded speed changes to be carried out more quickly (i.e. increased dynamic performance).

The actual motor speed and current may be used to calculate an actual power demand which may also be used for feedforward control of the generator 106.

The integrated generator-motor controller 110 further comprises a voltage detector 134 which is arranged to measure the voltage of the DC-link between the rectifier 118 and the inverter 120. This voltage is indicative of the power output of the generator 106 and is also sent to the field current regulator 132 as a source of feedback compensation (FB).

The combination of FF and FB compensations improves the dynamic performance and stability of the generator 106 and the propulsion system 110 as a whole. Furthermore, because the power supply from the generator 106 is more improved, the performance of the propulsion motor 108 is increased, because the loop gain is less variable and the DC-link voltage is more stable.

Figure 3:
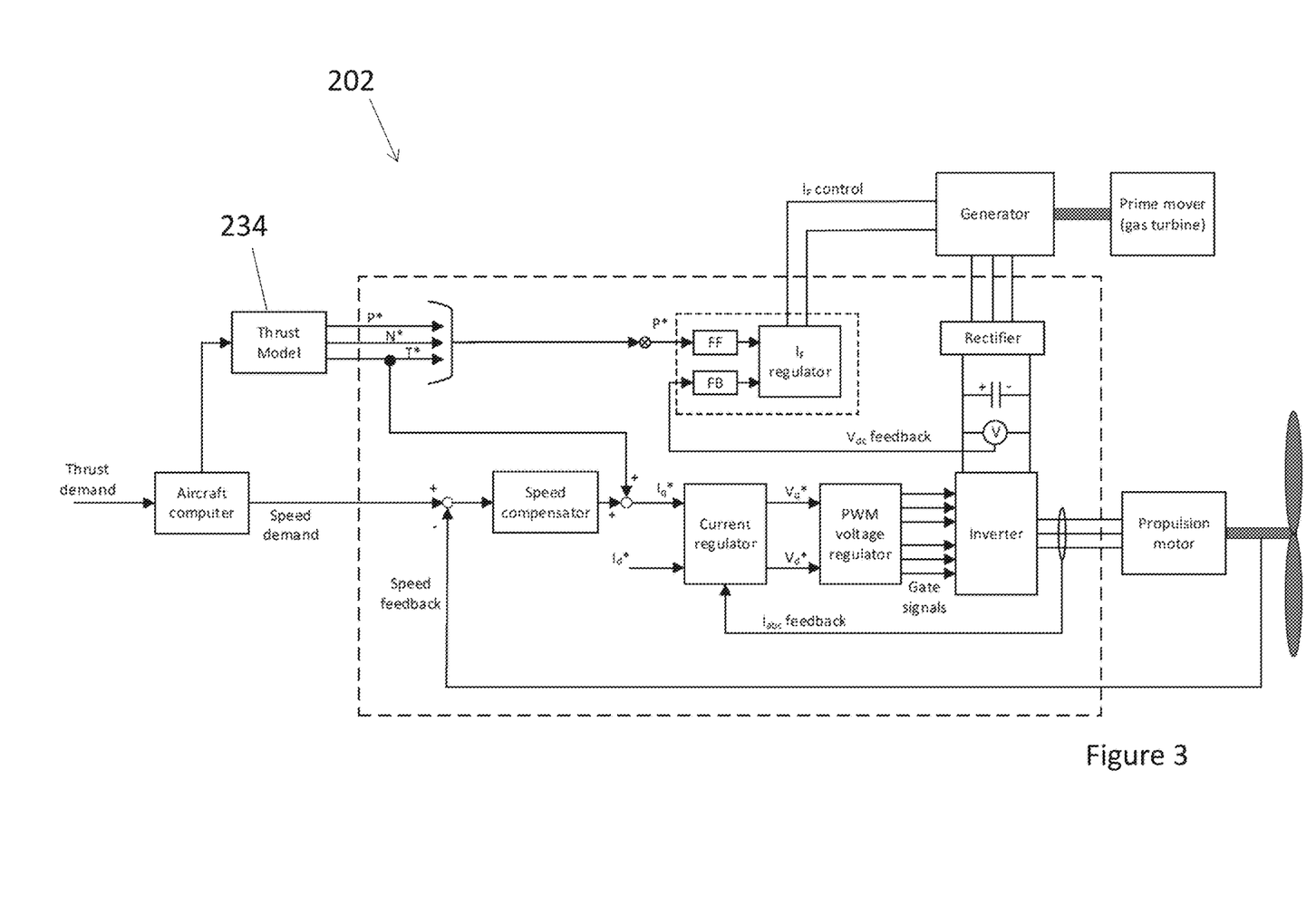
FIG. 3 shows another example of an electric propulsion system according to the present disclosure.

FIG. 3 shows another example of an electric propulsion system according to the present disclosure. The propulsion system 202 shares many similarities to the system 102 described above with reference to FIG. 2. However, in this example the instantaneous power demand P* fed-forward to the current field regulator 132 is determined using a thrust model 234 (e.g. as part of the aircraft computer). The thrust model 234 determines, based on a control input and information relating to the behavior and performance of the propulsion system 202, a power demand P*, speed demand N* and/or torque demand T* for the propulsion motor 108. At least one of the determined parameters (or a combination of two or more), possibly in combination with a speed command 112, is fed-forward to the field current regulator 132 to determine the field current IF required by the control input.

Furthermore, one or more outputs from the thrust model 234 may be used to determine the torque current Iq* sent to the current regulator 124.

Figure 4:
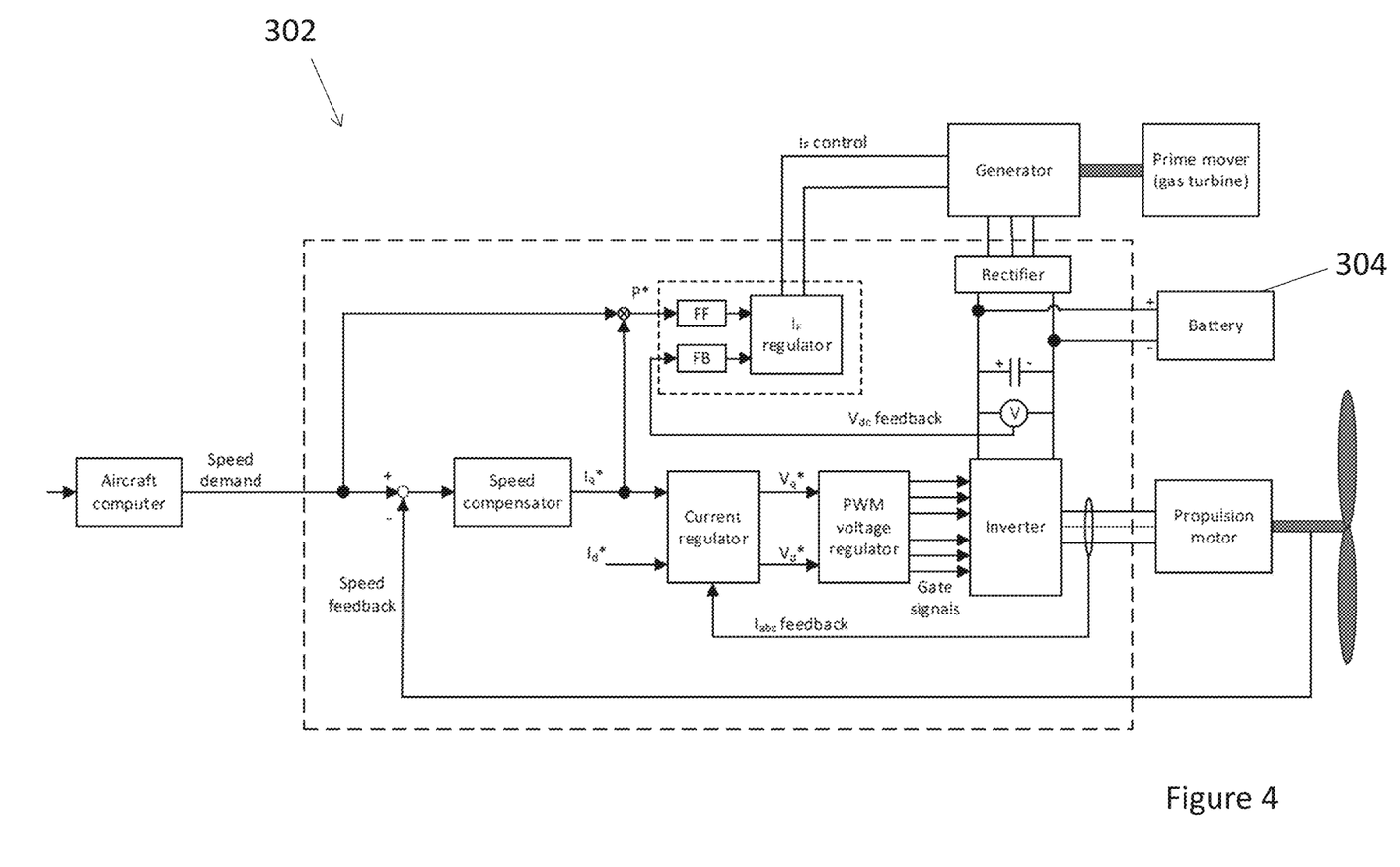
FIG. 4 shows a further example of an electric propulsion system according to the present disclosure.

FIG. 4 shows a further example of an electric propulsion system according to the present disclosure. The propulsion system 302 is generally similar to that shown in FIG. 2 and described above. However, the electric propulsion system 302 illustrated in FIG. 4 further comprises a battery 304 connected to the DC link in parallel with the rectifier 118 and the inverter 120.

In this example the propulsion system 302 may use the propulsion motor 108 to harvest energy while windmilling on the ground (i.e. acting as an electric generator, charging the battery 304 via the inverter 120). Moreover, it also allows harvesting energy during thrust reversal on landing either with reverse pitching of the propeller 114 or reverse rotation of the motor 108.

Figure 5:
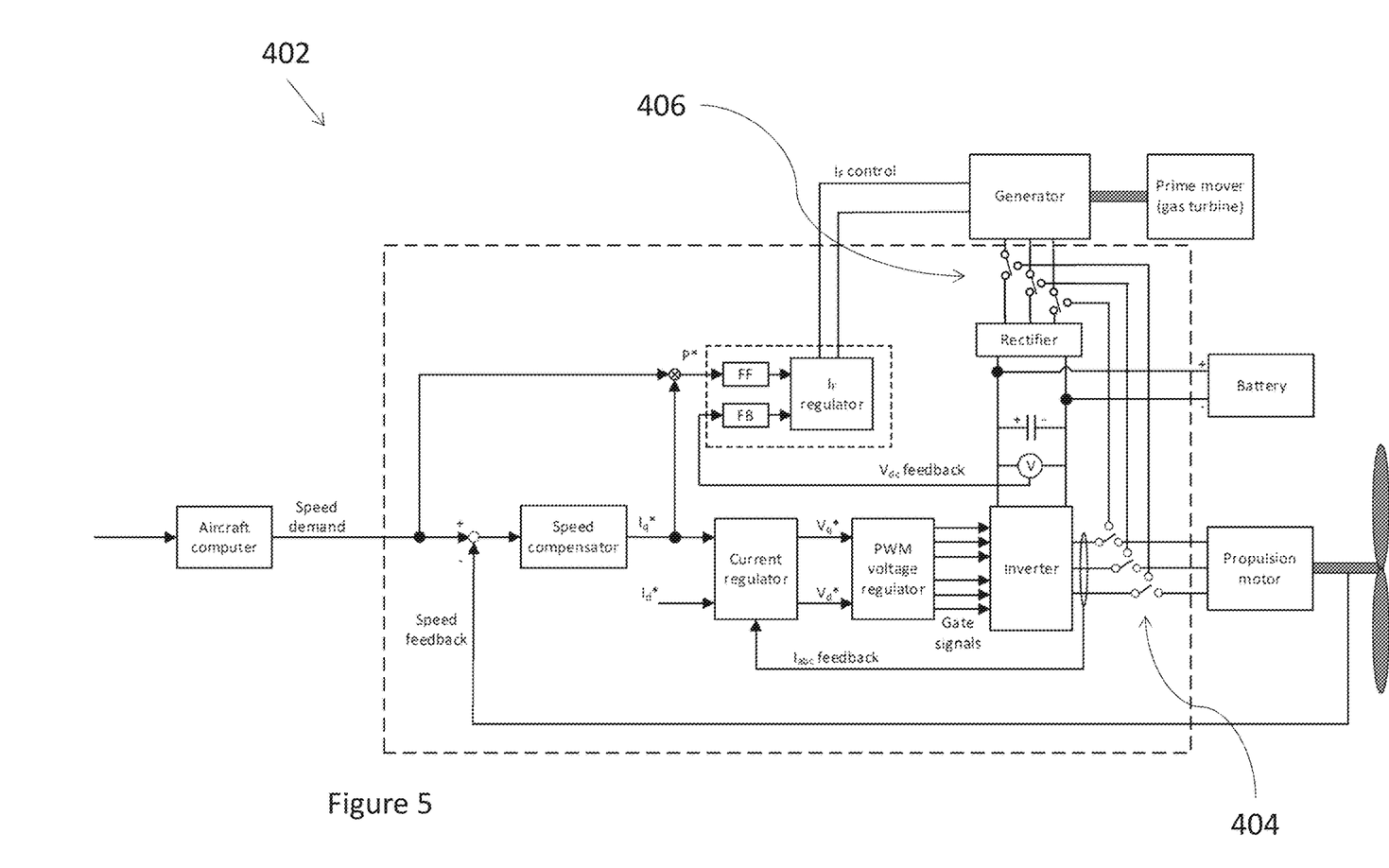
FIG. 5 shows a further example of an electric propulsion system according to the present disclosure.

FIG. 5 shows a further example of an electric propulsion system according to the present disclosure. The propulsion system 402 is generally similar to that shown in FIG. 4 and described above. However, the propulsion system 402 shown in FIG. 5 further comprises an inverter output reconfiguration function. By providing a first switching means 404 between the inverter 120 and the electric motor 108, and a second switching means 406 between the generator and the rectifier, the output of the inverter can be connected to either the propulsion motor 108 or the generator 106.

This configuration enables the generator 106 to be used as an electric motor to start the prime mover 104. This can be done using stored energy in the battery 302 or from another electrical power source.

As it is unlikely that both the propulsion and the starting functions are used simultaneously, this implementation of the disclosure eliminates the necessity of a dedicated starter for the prime mover 104 and maximizes the usage of the generator 106 and the inverter 120.

The invention claimed is:

1. An electric propulsion system comprising:
a prime mover;
an electric generator which is arranged to be driven by the prime mover to generate electric power;
an electric propulsion motor arranged to receive electric power directly from the electric generator; and
an integrated generator-motor controller arranged to control the supply of said electric power from the electric generator to the electric propulsion motor in response to a control signal to cause the electric propulsion motor to operate at different speeds;
wherein the integrated generator-motor controller is also arranged to feed-forward to the generator a power demand parameter associated with the control signal so as to control the power output of the generator; and
wherein the prime mover is controlled to operate at a constant speed whilst the electric propulsion motor operates at different speeds.

2. The electric propulsion system as claimed in claim 1, wherein the generator comprises one or more field windings to which a field current is supplied, and the generator is arranged to control the field current supplied to the one or more field windings according to the power demand parameter.

3. The electric propulsion system as claimed in claim 1, wherein the control signal comprises at least one of a motor speed command, a thrust command, a torque command or a power command.

4. The electric propulsion system as claimed in claim 1, wherein the power demand parameter comprises an instantaneous power demand.

5. The electric propulsion system as claimed in claim 1, wherein the prime mover is a combustion engine.

6. The electric propulsion system as claimed in claim 5, wherein the combustion engine is a gas turbine engine.

7. The electric propulsion system as claimed in claim 1, wherein the integrated generator-motor controller is arranged to receive a measure of the current speed of the electric propulsion motor.

8. The electric propulsion system as claimed in claim 7, wherein the integrated generator-motor controller is arranged to determine a required torque based on the control signal and the current speed of the motor.

9. The electric propulsion system as claimed in claim 8, wherein the power demand parameter is determined using the required torque.

10. The electric propulsion system as claimed in claim 1, wherein the power demand parameter is determined using a thrust model.

11. The electric propulsion system as claimed in claim 1, wherein the integrated generator-motor controller is arranged to determine an indicator of electric power generated by the generator.

12. The electric propulsion system as claimed in claim 11, wherein the power demand parameter is determined using the indicator of electric power generated by the generator.

13. The electric propulsion system as claimed in claim 1, further comprising an energy storage device which is arranged to be connected to the generator or the propulsion motor.

14. The electric propulsion system as claimed in claim 1, wherein the integrated generator-motor controller is arranged to control an inverter to control the supply of said electric power to the electric propulsion motor and wherein the electric propulsion system further comprises a first switching means arranged to allow the inverter to be selectably connected to the generator or to the propulsion motor.

15. The electric propulsion system as claimed in claim 1, wherein the integrated generator-motor controller is arranged to measure a current of the electric power supplied to the electric motor.

* * * * *